Patented May 23, 1950

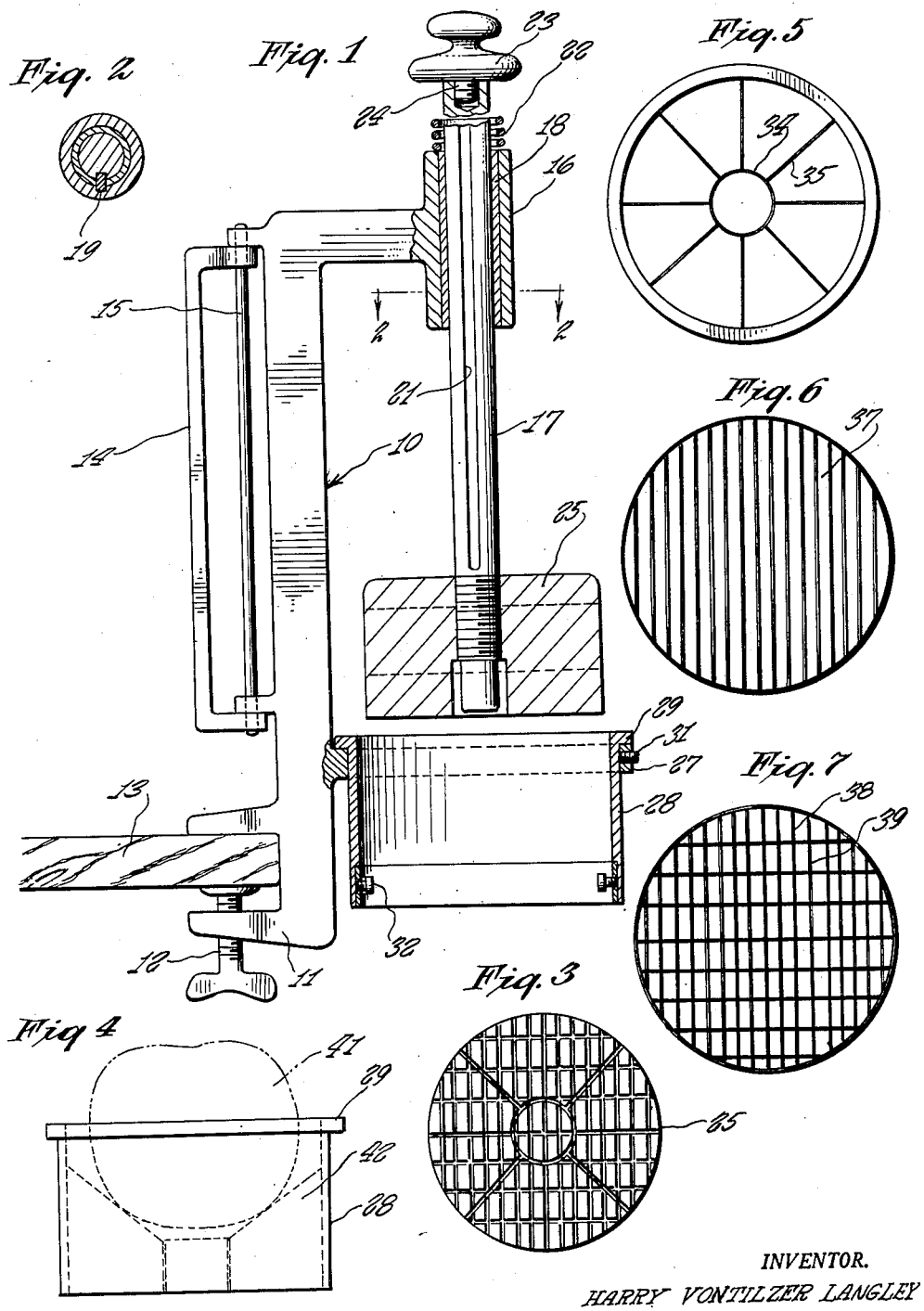

2,509,190

UNITED STATES PATENT OFFICE 2,509,190

FRUIT AND VEGETABLE CUTTER WITH STATIONARY KNIVES AND RECIPROCATING PLUNGER

Harry V. Langley, Glenn's Ferry, Idaho

Application July 25, 1947, Serial No. 763,519

2 Claims. (Cl. 146—169)

This invention relates to kitchen utensils and more particularly to such utensils which can be used for grating of vegetables and fruits.

It is an object of the present invention to provide a kitchen utensil which can be easily operated to effect the grating of vegetables or fruit with a minimum of effort whereby the labors of the housewife may be materially reduced.

Other objects of the present invention are to provide a kitchen utensil or slicing or grating machine which is provided with a pushing element which has its end formed with a plurality of slots arranged so that the one pushing element can be used for several different styles of cutting knives and whereby the pushing element will be extended through any of the different cutting knives so that the grated or cut vegetables or fruit will be extended through the full height of the knife.

Other objects of the present invention are to provide a kitchen utensil of the above type which is of simple construction, inexpensive to manufacture and efficient in operation.

For other objects and for a better understanding of the invention, reference may be had to the following detailed description taken in connection with the accompanying drawing, in which:

Fig. 1 is an elevational view of my kitchen utensil with portions broken away to show the interior of certain parts of the same.

Fig. 2 is a transverse cross-sectional view taken on line 2—2 of Fig. 1.

Fig. 3 is an end face view of the pushing element.

Fig. 4 is a side elevational view of the retaining element for the fruit or vegetable and into which the different knives are fitted.

Figs. 5, 6 and 7 are respectively plan views of different types of knives, the knife shown in Fig. 5 being adapted to effect the coring and slicing of an apple or other fruit having a core, the Fig. 6 showing a knife adapted to provide slices of the vegetable or fruit, Fig. 7 showing a knife adapted to provide string or french fried cuts of potatoes.

Referring now to Fig. 1, 10 represents a support having a clamp portion 11 thereon with an adjusting screw 12 which can be tightened upwardly against the bottom face of a shelf 13. The support may, if desired, be attached by means of a bracket 14 to a wall and pivoted with respect to the bracket upon a shaft 15 extending vertically from the top and bottom ends thereof. Extending outwardly from the top of the support 10 is a sleeve portion 16 through which a shaft or plunger rod 17 is slidably extended. A bearing sleeve 18 may be provided within the sleeve portion 16. A key 19 is extended into a keyway or groove 21 in the plunger shaft 17. A spring 22 surrounding the shaft 17 reacts between the top of the sleeve portion 16 and a handle 23 screw threaded into the top of the shaft 17 as shown at 24.

On the lower end of the shaft 17 there is threaded a pushing element or block 25. This pushing element or block has its bottom face slit as shown in Fig. 3 for a given distance so that the spaces within the face can receive the cutting portions of any one of the several knives shown in Figs. 5, 6 and 7.

Extending outwardly from the support 10 is a ring-shaped bracket 27 into which is fitted a flanged sleeve 28. This sleeve is supported from its flange 29 and is retained against rotation within the ring 27 by a set screw 31. Into the bottom end of the sleeve 29 there may be fitted any one of the knives shown in Figs. 5, 6 and 7 and these knives can be retained therewithin by set screws 32.

The knife shown in Fig. 5 is particularly adapted for coring and slicing apples. This knife has a round knife portion 34 and radially extending knife portions 35 to effect the slicing of the apple while the core is being removed from the same. Fig. 6 shows a knife with parallel extending blades 37 for effecting a thin slicing of the vegetable. Fig. 7 shows a knife with cutting blades 38 and 39 crossing one another whereby to form french fried potato slices or the like. The bottom of the pushing element 25 will be extended through the knives when lowered to the full extent whereby to cause the complete extraction of all of the portions of the vegetable or fruit which have been cut. When the pushing element 25 has been sufficiently raised, the vegetable or fruit can be deposited into the top of the sleeve 28 and rested upon the knife fixed to the bottom of the same.

In Fig. 4, this vegetable is indicated at 41. A modified form of knife is used. The knife with this form of the invention is a part of the sleeve 28 and is replaceable only by removing the sleeve and placing within the ring 27 another sleeve with a differently arranged set of knife blades therein. The knife blades may extend upwardly to a higher extent near the outer periphery of the same as indicated at 42.

It will be noted that the pushing element 25 has a central bottom opening and that the shaft 17 is threaded into the pushing element and projects into the bottom opening of the pushing element whereby to serve to eject from the circular portion of the knife, the portion of vegetable or fruit or the core of an apple.

While various changes may be made in the detail construction, it shall be understood that such changes shall be within the spirit and scope of the present invention as defined by the appended claims.

Having thus set forth and disclosed the nature of my invention, what is claimed is:

1. A cutting device for kitchen use comprising a support, a sleeve mounted on the support, knife means connected to the bottom of the sleeve on which a vegetable or fruit may be rested, a pushing element having its bottom face slit to provide portions so that the pushing element may be extended between the parts of the knife means so as to cause all of the cut portions of the vegetable or fruit to be ejected from the knife means, a shaft extended upwardly from the pushing element, a sleeve portion on the upper end of the support through which the shaft is slidably adjusted, and means for retaining the shaft, the pushing element and the sleeve against rotation relative to one another so that the alignment of the pushing element face will be maintained with the knife means at all times, the slits as provided on the bottom face of the pushing element conforming to several different patterns so as to accommodate different knives which may be disposed beneath the pushing element, said pushing element having a bottom central opening, said shaft being threadedly connected to the pushing element and extending into the opening to provide a core pushing portion, said knife means including a circular knife portion adapted to enter the central opening of the pushing element, said circular knife portion and the extending end portion of the shaft being substantially coextensive when in nested relation.

2. A cutting utensil for kitchen use comprising a support, a sleeve portion on the upper end of the support, a shaft vertically adjustable through the sleeve portion, a pushing element on the lower end of the shaft having its bottom face slit, and knife means disposed beneath the pushing element and adapted to support a vegetable or fruit while being pushed therethrough to grate the same, the cutting blades within the sleeve being of greater height at the outer periphery of the knife means whereby to cause the vegetable or fruit to be initially centered when disposed within the sleeve, said knife means including a circular knife portion, said pushing element having a central bottom opening, said shaft being threadedly connected to the pushing element and extending into the bottom opening, said bottom opening being adapted to receive the circular knife portion of the knife means and the shaft end serving to push out the vegetable or fruit portion which has been sliced or cored by the circular knife portion, said circular knife portion and extending end portion of the shaft being substantially coextensive when in nested relation.

HARRY V. LANGLEY.

REFERENCES CITED

The following references are of record in the file of this patent:

UNITED STATES PATENTS

| Number | Name | Date |
|---|---|---|
| 533,189 | Beuttel | Jan. 29, 1895 |
| 573,551 | Sternberg | Dec. 22, 1896 |
| 2,004,858 | Farabough | June 11, 1935 |
| 2,291,449 | Burgess | July 28, 1942 |

FOREIGN PATENTS

| Number | Country | Date |
|---|---|---|
| 414,272 | Germany | May 28, 1925 |